July 12, 1927.  
F. J. MICHALLAT  
1,635,190  
APPARATUS FOR DECORATING CHOCOLATES, CONFECTIONERY, AND THE LIKE  
Filed Nov. 7, 1924  
3 Sheets-Sheet 1
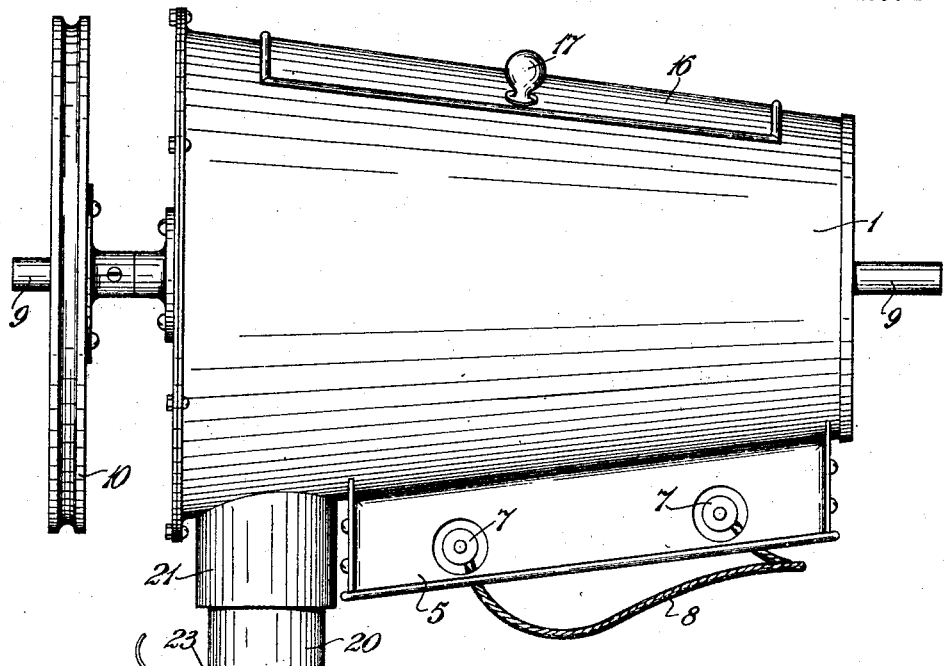
FIG. 1.
FIG. 4.
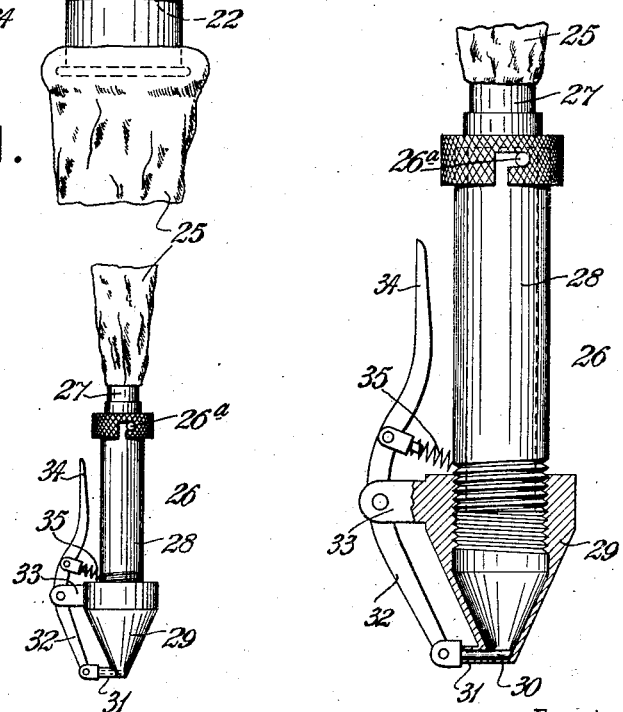
INVENTOR:
Francis Joseph Michallat.
ATTORNEY:

July 12, 1927.

F. J. MICHALLAT 1,635,190

APPARATUS FOR DECORATING CHOCOLATES, CONFECTIONERY, AND THE LIKE

Filed Nov. 7, 1924    3 Sheets-Sheet 2

INVENTOR

Francis Joseph Michallat.

ATTORNEY:

July 12, 1927.
F. J. MICHALLAT
1,635,190
APPARATUS FOR DECORATING CHOCOLATES, CONFECTIONERY, AND THE LIKE
Filed Nov. 7, 1924   3 Sheets-Sheet 3
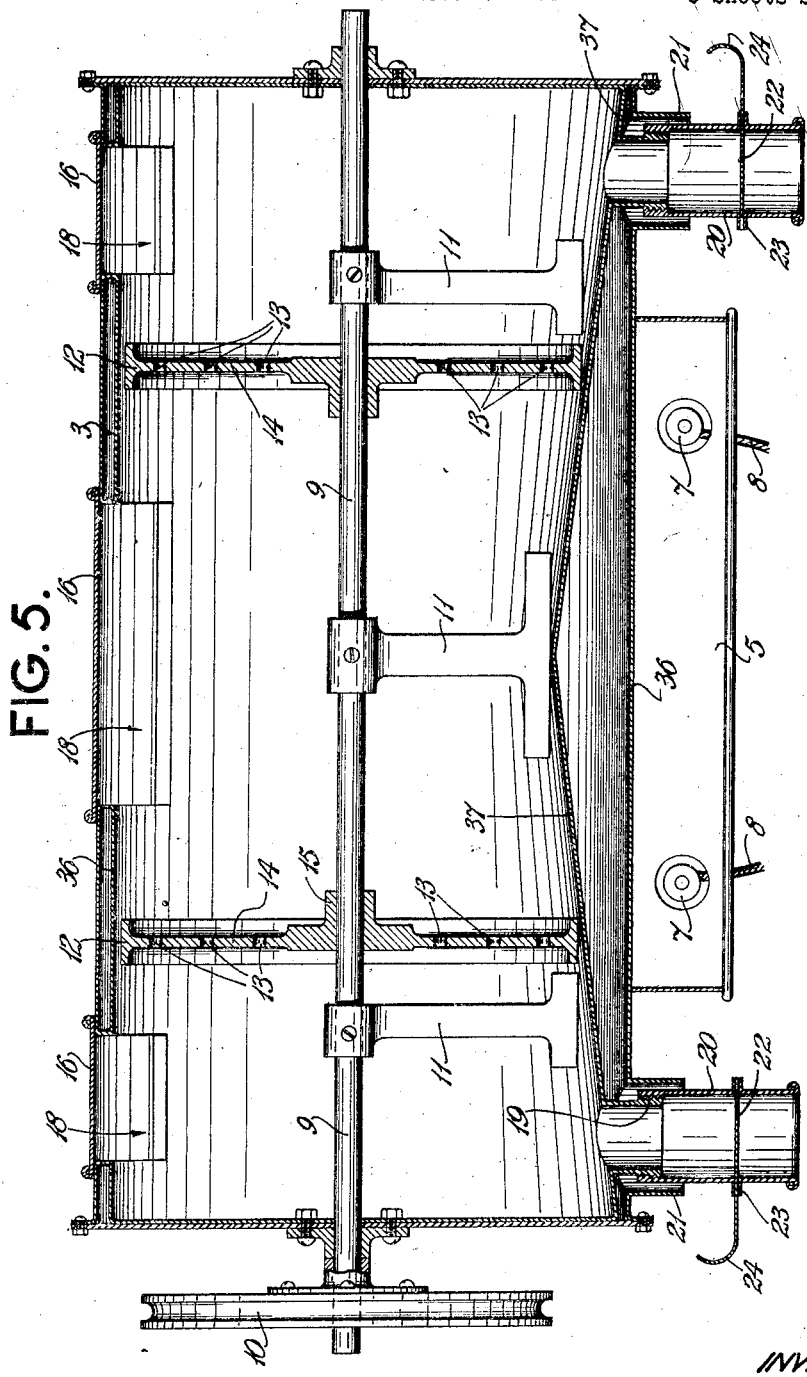
INVENTOR
Francis Joseph Michallat.
ATTORNEY:

Patented July 12, 1927.

1,635,190

UNITED STATES PATENT OFFICE.

FRANCIS JOSEPH MICHALLAT, OF NORWICH, ENGLAND, ASSIGNOR, BY MESNE ASSIGNMENTS, TO BAKER PERKINS COMPANY, INC., OF SAGINAW, MICHIGAN, A CORPORATION OF NEW YORK.

APPARATUS FOR DECORATING CHOCOLATES, CONFECTIONERY, AND THE LIKE.

Application filed November 7, 1924, Serial No. 748,389, and in Great Britain December 15, 1923.

This invention relates to apparatus for decorating chocolates, confectionery and the like of that type which comprises a vessel or pan adapted to contain the decorating substance, such as chocolate, and a discharge bag or the like which is fitted so as to be in communication with the interior of said vessel and from which the material can be caused to issue onto the articles to be decorated, for example through a suitable nozzle attached to the bag.

According to the present invention the vessel or pan is of conical or tapered form in longitudinal section and is located with its axis horizontal or substantially so, whereby the contents will readily flow or drain down to one end at which is located the outlet to which the bag is applied. The vessel is wholly or partially jacketed for reception of a tempering medium such as steam, hot water or the like and is provided with a revolving spindle suitably driven through any suitable mechanism or manually and on which is mounted a mixing blade, worm or other agitating means. In addition to said mixing means the spindle carries a perforated disc, baffle or the like, located suitably about the longitudinal centre of the vessel which acts as a strainer for the decorating substance on its way to the outlet and bag, and another similar strainer may also be located in said outlet in advance of the bag and suitably in the form of a perforated slide or plate which can be easily inserted in, or removed from, the outlet for cleaning purposes.

The vessel is also provided, conveniently, at or adjacent the top with a door or cover, either hinged or removable, for insertion of the decorating substance and access to the interior and so arranged that access can be readily had to both sides of the perforated disc or baffle, previously mentioned.

Two embodiments of the invention are illustrated in the accompanying drawings in which:—

Figure 2:
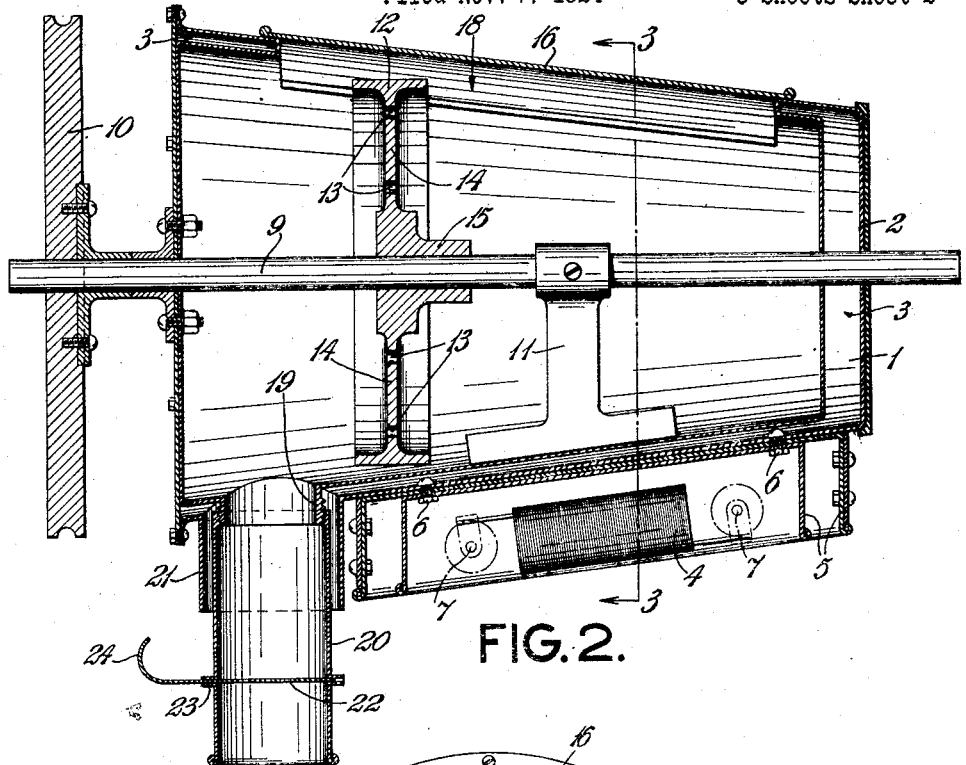
Figure 3:
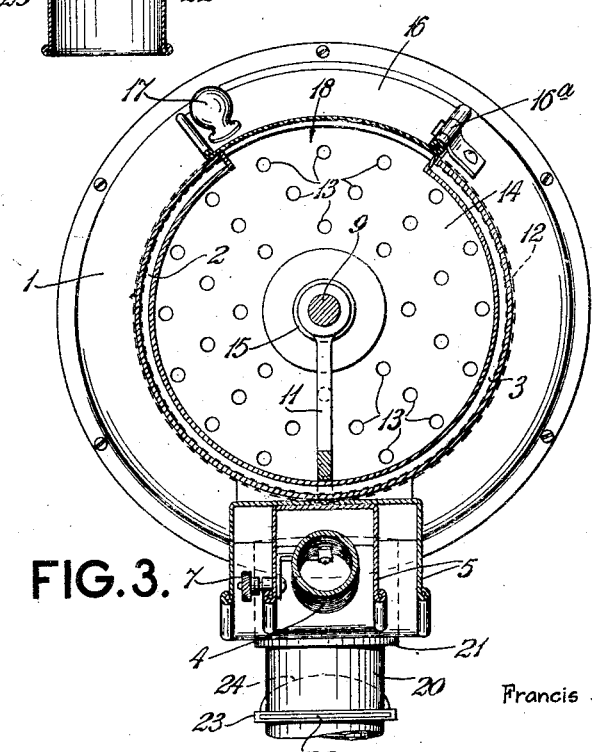

Fig. 1 is a side elevation of one embodiment with a part broken away. Fig. 2 is a central longitudinal section of this embodiment. Fig. 3 is a cross section on the line 3—3 of Fig. 2. Fig. 4 is a sectional detail view on an enlarged scale of a decorating nozzle applied to the bag, and Fig. 5 is a central longitudinal section of the second embodiment with bags and decorating nozzles omitted.

To first refer to Figs. 1 to 4 the container or pan 1 is of conical or tapered formation and as shown is provided with a jacket or double-wall 2, forming a space 3 for circulation of air heated by means of an electric heating unit 4 of any appropriate form contained in a double walled housing 5 attached as by screws 6 to the base of the container and whose terminals 7 are connected to any suitable leads or conductors 8.

Within the container is an axial shaft 9 driven as by an exterior pulley 10 mounted thereon, or by any other convenient means, and carrying within the container a mixing arm or beater 11 to agitate or stir the decorating substance therein. Rigidly mounted on the shaft 9 within the container is also a revoluble disc or baffle 12 having a plurality of perforations 13 formed in its central web 14 which web carries a boss 15 which is secured to the shaft by any appropriate means. At the top the container 1 is provided with a door 16 hinged as at 16ᵃ and provided with a knob 17 and fastening device. The opening 18 which this door normally closes is of such size that access can be readily had to the interior of the container for cleaning purposes and to both sides of the disc or baffle 12 for the same reason.

The said disc or baffle strains the decorating substance as it flows down the tapered wall of the container to the outlet 19 which is located at the lowest part thereof, this outlet being shown in the form of a threaded boss to which is exteriorly screwed a delivery tube 20. A portion 21 of the jacket or double wall 2 of the container surrounds said boss and part of the tube 20. The latter contains a cut-off valve shown in the form of a plate or disc 22 adapted to slide in guides 23 formed in the wall of the tube and operable from the exterior by a finger piece 24.

To the lower end of the discharge tube 20 is applied the upper end of a flexible bag 25, such as of canvas or other textile material, the lower end of this bag carrying a delivery device 26 by which the decorating substance is applied to the goods. This device is connected to the bag by means of a bayonet joint fastening 26ᵃ attached to a short tube 27 extending from the lower end of the bag and consists of a tube 28 threaded at its lower end to receive a tapered nozzle 29 the outlet of which is normally closed by a valve in the form of a pin 30, guided in an extension 31 of the nozzle and operated by means of a lever 32 pivoted in a lug 33, extending from the nozzle and having a finger piece 34. A spring 35 acting on the lever normally keeps the valve in closed position. By guiding the nozzle in any direction desired, which is permitted by the flexibility of the bag 25, and opening and closing the valve 30 by manipulating the lever 32 decorations of any desired pattern or character can be readily applied to the goods.

To now turn to the embodiment illustrated in Fig. 5 the same general construction is adopted but the apparatus is formed as a double or duplex one, that is to say, two discharge outlets are provided to each of which is applied a bag and nozzle (not shown) as in the former construction.

Here the container body 36 is generally cylindrical but is provided with a doubly inclined base 37 which leads downwards to opposite ends of the container to the respective outlets or discharge tubes 20. In this form also the axial shaft 9 carries three mixing or beating arms 11 and two straining discs or baffles 12 one in advance of each outlet. Three doors 16 are provided at the top of the container in order to provide access to all parts thereof and to both sides of the strainer baffles. The remaining parts are given corresponding reference characters to those of the Figs. 1 to 4 construction.

If desired, the whole apparatus may be provided with brackets or other means of connection to a machine for coating or otherwise treating confectionery so that it may form an attachment thereto for ready manipulation by the operatives and form an integral unit with such a machine.

What I claim as my invention and desire to secure by Letters Patent of the United States is:—

1. Apparatus for decorating confectionery comprising a container for decorating substance disposed with its axis horizontal or substantially so and having a downwardly inclined base, a flexible discharge bag in communication with the interior of said container and receiving the substance from said inclined base, a discharge nozzle applied to the outlet end of the bag, a valve in said nozzle, and manipulative means carried by the nozzle for controlling said valve.

2. Apparatus for decorating confectionery comprising a closed container of truncated conical form for receiving decorating substance disposed with its axis horizontal or substantially horizontal, said container having an outlet to one side of the base of the cone to which the substance is led by the conical wall of the container, and a flexible discharge bag applied to said outlet.

3. Apparatus for decorating confectionery comprising a closed container of truncated conical form for decorating substance, disposed with its axis horizontal or substantially horizontal, said container having an outlet to one side of the base of the cone to which the substance is led by the conical wall of the container, a flexible discharge bag applied to said outlet, a discharge nozzle applied to the outlet end of the bag, and valve means for controlling the passage through the nozzle.

4. Apparatus for decorating confectionery comprising a container for decorating substance disposed with its axis horizontal or substantially horizontal and having a downwardly inclined base, said container having an outlet adjacent its lowest part to which the substance is led by said inclined base, a flexible discharge bag applied to said outlet, and a revoluble perforated baffle within the container in advance of the outlet.

5. Apparatus for decorating confectionery comprising a container for decorating substance disposed with its axis horizontal or substantially horizntal and having a downwardly inclined base, said container having an outlet adjacent its lowest part to which the substance is led by said inclined base, a flexible discharge bag applied to said outlet, a revoluble perforated baffle within the container in advance of the outlet and means for providing access to the container and to both sides of the perforated baffle.

6. Apparatus for decorating confectionery comprising a container for decorating substance disposed with its axis horizontal or substantially horizontal and having a downwardly inclined base, said container having an outlet adjacent its lowest part to which the substance is led by said inclined base, flexible discharge bag applied to said outlet, a revoluble perforated baffle within the container in advance of the outlet, means for providing access to the container and to both sides of the perforated baffle, a discharge nozzle applied to the outlet end of the bag, a valve in said nozzle and manipulative means carried by the nozzle for controlling said valve.

7. Apparatus for decorating confectionery comprising a container for decorating substance disposed with its axis horizontal and having a base inclined downwardly from the center to opposite ends of the container, a flexible discharge bag at each end of the container in communication with the interior thereof and to each of which the substance is led by one portion of said inclined base, a nozzle at the outlet end of each bag, and valve means for controlling the passage through said nozzles.

8. An apparatus for decorating confectionery comprising a container for decorating substance disposed with its axis horizontal and having a base inclined downwardly to its ends from its longitudinal center in both directions, said container having an outlet adjacent the lowest part at each end, a flexible discharge bag applied to each of said outlets in communication with the interior of the container and to each of which the substance is led by one portion of said inclined base, and a revoluble perforated baffle within the container in advance of each of said outlets.

9. An apparatus for decorating confectionery comprising a container for decorating substance disposed with its axis horizontal or substantially so and having a base inclined downwardly to an end whereby the substance may flow to said end by gravity, mixing means rotatable about the axis of the container, an outlet at the lower end of the container, a flexible discharge bag applied to said outlet, and rotary baffle means disposed in advance of said outlet.

In witness whereof I have signed this specification.

FRANCIS JOSEPH MICHALLAT.